US011909491B2

(12) United States Patent
Sakhnini et al.

(10) Patent No.: US 11,909,491 B2
(45) Date of Patent: Feb. 20, 2024

(54) BEAM SWITCHING GAP CONFIGURATION AT LONGER CYCLIC PREFIX POSITIONS

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 17/583,068

(22) Filed: Jan. 24, 2022

(65) Prior Publication Data

US 2022/0247473 A1 Aug. 4, 2022

Related U.S. Application Data

(60) Provisional application No. 63/144,325, filed on Feb. 1, 2021.

(51) Int. Cl.
*H04B 7/06* (2006.01)
*H04L 27/26* (2006.01)
*H04W 72/12* (2023.01)
*H04W 72/1263* (2023.01)

(52) U.S. Cl.
CPC ....... *H04B 7/0695* (2013.01); *H04L 27/2607* (2013.01); *H04L 27/26025* (2021.01); *H04W 72/1263* (2013.01)

(58) Field of Classification Search
CPC .............. H04B 7/0695; H04L 27/2602; H04L 27/26025; H04L 27/2607; H04L 5/0053; H04W 72/1263
See application file for complete search history.

(56) References Cited

U.S. PATENT DOCUMENTS

2023/0170969 A1\* 6/2023 Kim ...................... H04L 1/0057 375/267

\* cited by examiner

*Primary Examiner* — Melvin C Marcelo
*Assistant Examiner* — Natali Pascual Peguero
(74) *Attorney, Agent, or Firm* — ArentFox Schiff LLP

(57) ABSTRACT

Example implementations include a method, apparatus and computer-readable medium of wireless communication. A user equipment (UE) may receive a configuration indicating whether a beam switching gap is expected at a first symbol position within a subframe of a physical channel for the UE, the first symbol position having a first cyclic prefix length that is longer than a second cyclic prefix length of a second symbol position within the subframe of the physical channel for the UE. The UE may determine whether a transmission includes a missing symbol for the beam switching gap based on the configuration and the symbol position of a symbol where a beam switch is scheduled.

30 Claims, 10 Drawing Sheets

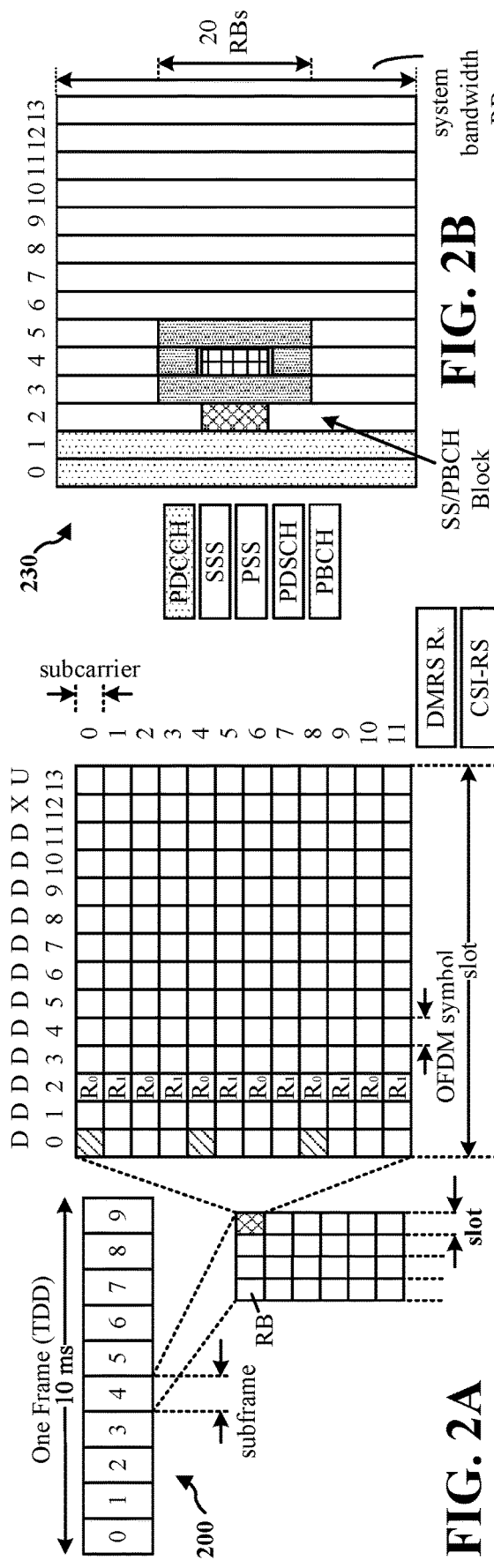
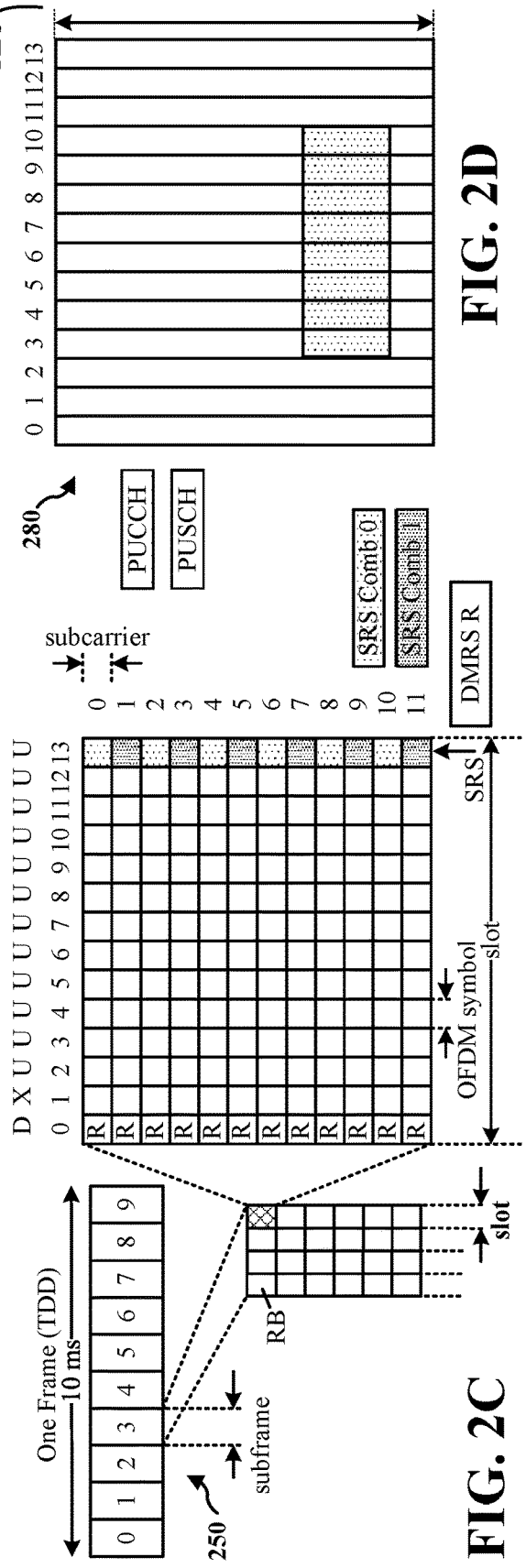
FIG. 2A
FIG. 2B
FIG. 2C
FIG. 2D

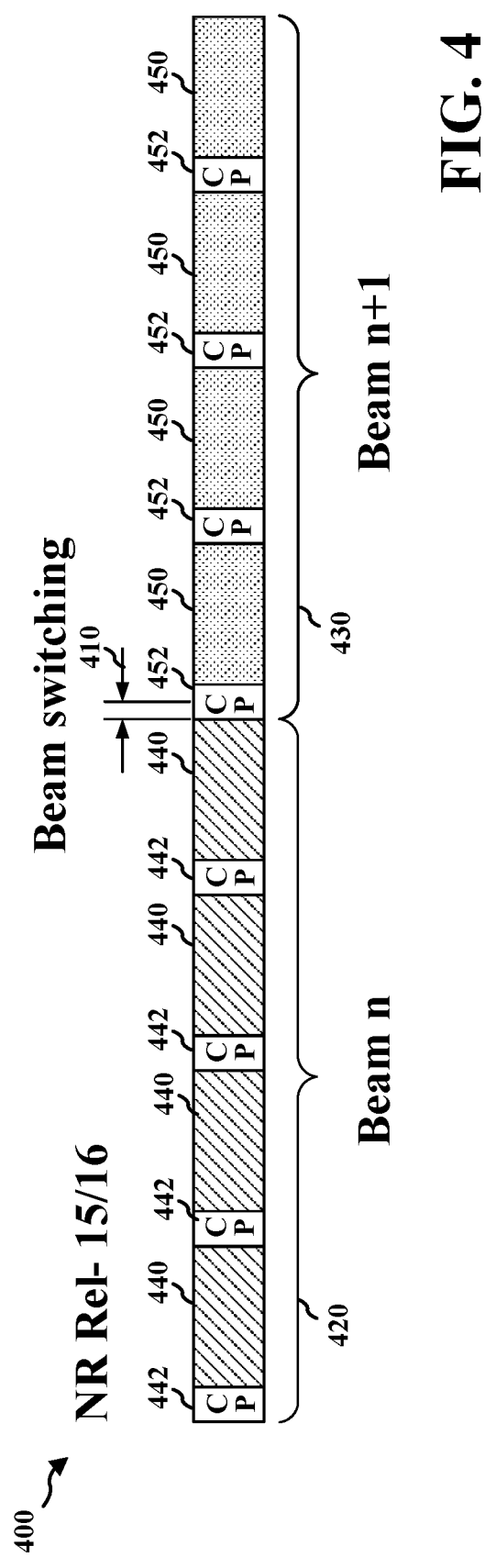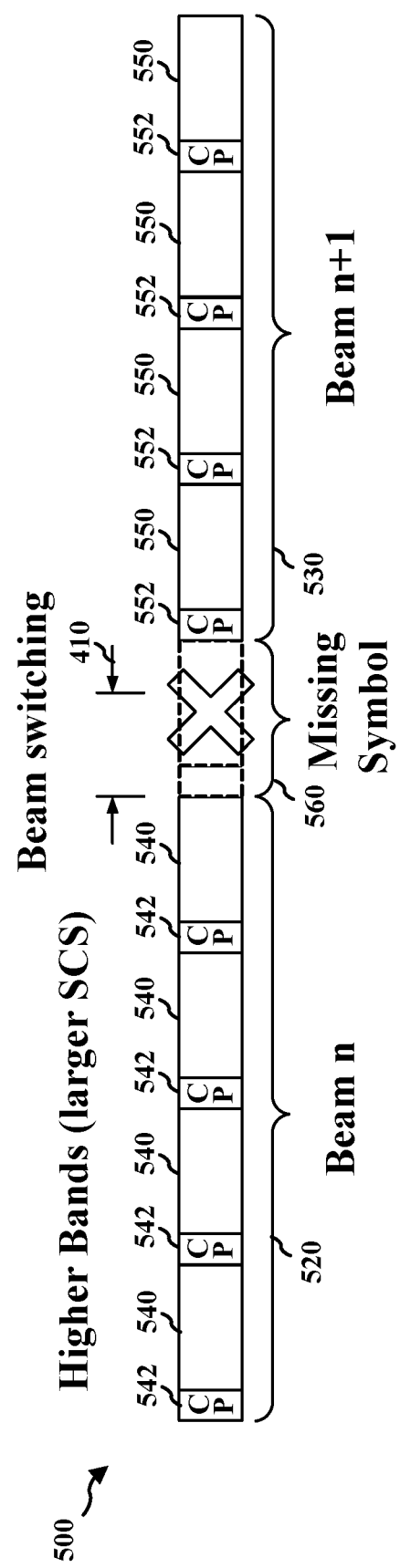

BEAM SWITCHING GAP CONFIGURATION AT LONGER CYCLIC PREFIX POSITIONS

CROSS REFERENCE TO RELATED APPLICATIONS

This application claims priority to U.S. Provisional Application No. 63/144,325 titled "BEAM SWITCHING GAP CONFIGURATION AT LONGER CYCLIC PREFIX POSITIONS," filed Feb. 1, 2021, which is assigned to the assignee hereof, and incorporated herein by reference in its entirety.

BACKGROUND

Technical Field

The present disclosure relates generally to communication systems, and more particularly, to configuration of a beam switching gap at a longer cyclic prefix position.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a user equipment (UE). The method may include receiving a configuration indicating whether a beam switching gap is expected at a first symbol position within a subframe of a physical channel for the UE, the first symbol position having a first cyclic prefix length that is longer than a second cyclic prefix length of a second symbol position within the subframe of the physical channel for the UE. The method may include determining whether a transmission includes a missing symbol for the beam switching gap based on the configuration and the symbol position of a symbol where a beam switch is scheduled The disclosure also provides an apparatus (e.g., a UE) including a memory storing computer-executable instructions and at least one processor configured to execute the computer-executable instructions to perform the above method, an apparatus including means for performing the above method, and a computer-readable medium storing computer-executable instructions for performing the above method.

In another aspect, the disclosure provides a method of wireless communication for a base station. The method may include transmitting a configuration indicating whether a beam switching gap is expected at a first symbol position within a subframe of a physical channel for a UE, the first symbol position having a first cyclic prefix length that is longer than a second cyclic prefix length of a second symbol position within the subframe of the physical channel for the UE. The method may include determining whether a transmission includes a missing symbol for the beam switching gap based on the configuration and the symbol position of a symbol where a beam switch is scheduled The disclosure also provides an apparatus (e.g., a base station) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a UL channels within a subframe.

FIG. 4 is a diagram of an example beam switching operation during a cyclic prefix (CP).

FIG. 5 is a diagram of an example beam switching operation during a gap due to a missing symbol.

DETAILED DESCRIPTION

Figure 1:
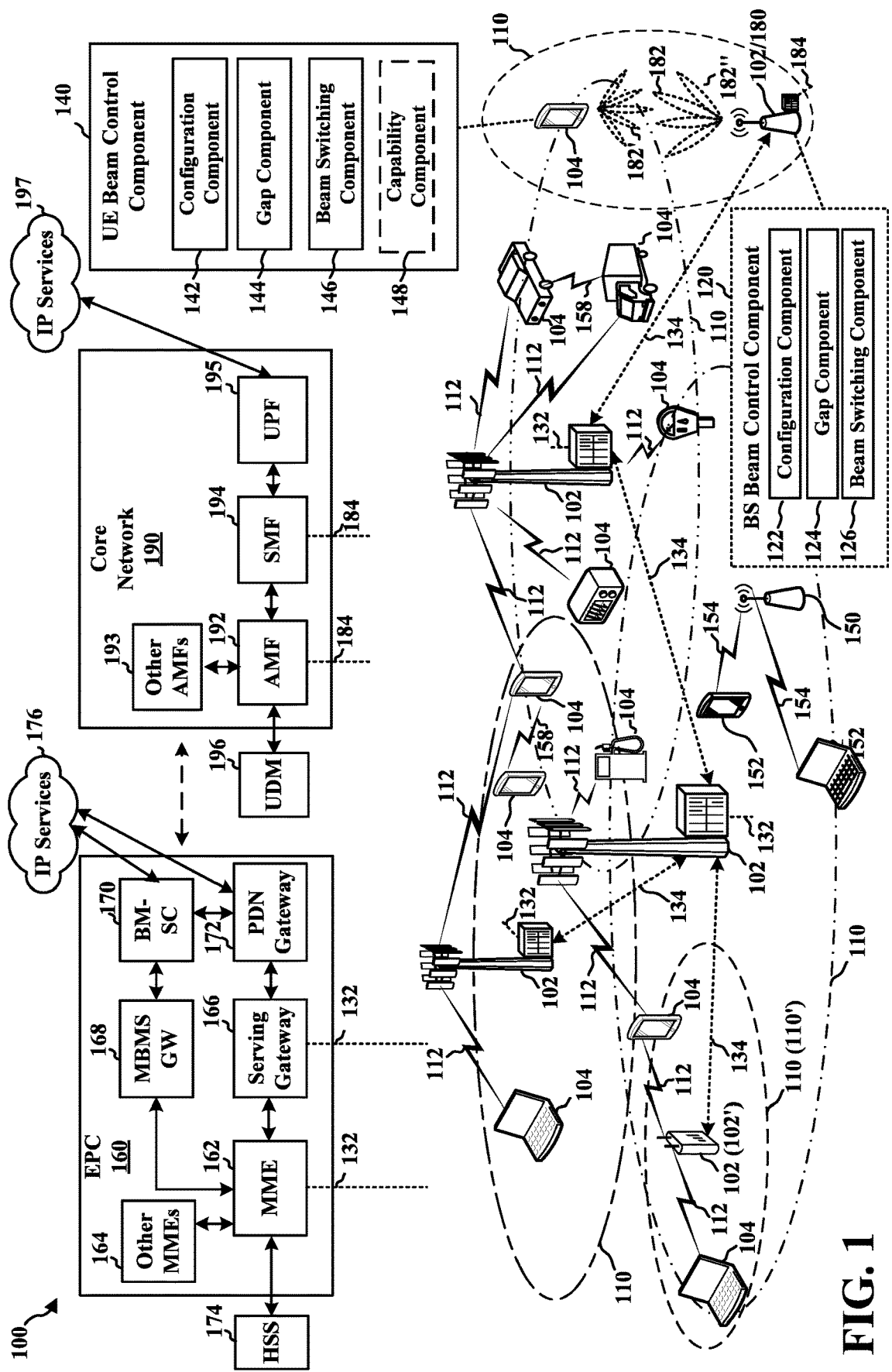
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A wireless network may utilize beamforming to improve signal quality between a base station and a user equipment (UE). The base station may configure the UE with various beam configurations, which may be referred to as a transmission configuration indicator (TCI) state for downlink transmissions and a spatial relation indicator (SRI) for uplink transmissions. The base station may transmit a beam switch command to the UE to change to one of the configured beams for a transmission. The base station and the UE may determine an activation time for the beam switch based on the beam switch command and change beams at the same time.

In an aspect, changing beams at either the base station or the UE may occur over a beam switching time during which the base station or the UE is unable to transmit or receive. For example, the beam switching time may be on the order of 100 nanoseconds (ns). Conventionally, a 1 millisecond (ms) subframe includes a number of symbols, each symbol having a cyclic prefix (CP) that was significantly longer than the 100 ns beam switching time. The base station and the UE can perform the beam switch during the CP and only redundant information would be lost. Accordingly, the base station and the UE would be able to transmit or receive the symbol using the new beam. However, as higher frequencies are utilized, numerologies having a greater subcarrier spacing (SCS) and shorter symbol time may be used. In such numerologies, the length of the CP may be shorter than the beam switching time. One approach to beam switching for such numerologies is to create a beam switching gap by skipping one or more symbols when the beam switch occurs. Such an approach, however, results in missing symbols and a reduction in data throughput.

In an aspect, the present disclosure provides for configuration of beam switching gaps based on a position of a symbol within a subframe. One or more symbols within a subframe may be allocated a longer CP based on position. For example, the first symbol within a subframe and a symbol after the middle of the subframe may have the longer CP. Depending on capabilities of the UE and the base station, the beam switching time may occur during the longer CP without creation of a beam switching gap including missing symbols. The base station may provide a configuration indicating whether a beam switching gap is expected at a first symbol position (e.g., the symbol position having the longer CP) within a subframe of a physical channel for the UE. The UE and the base station may determine whether a transmission includes a missing symbol for the beam switching gap based on the configuration and the symbol position of a symbol where a beam switch is scheduled. Accordingly, both the UE and the base station may perform the beam switch and account for any missing symbols.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs.

In an aspect, one or more of the UEs 104 may include a UE beam control component 140 that switches a transmit beam or a receive beam based on a configuration and an indicated symbol. The UE beam control component 140 may include a configuration component 142 configured to receive a configuration indicating whether a beam switching gap is expected at a first symbol position within a subframe of a physical channel for the UE. The first symbol position may have a first cyclic prefix length that is longer than a second cyclic prefix length of a second symbol position within the subframe of the physical channel for the UE. The UE beam control component 140 may include a gap component 144 configured to determine whether a transmission includes a missing symbol for the beam switching gap based on the configuration and the symbol position of a symbol where a beam switch is scheduled. In some aspects, the UE beam control component 140 may optionally include a beam switching component 146 configured to change beams during a cyclic prefix of the symbol where the beam switch is scheduled or during the missing symbol based on the determination. In some implementations, the UE beam control component 140 may optionally include a capability component configured to transmit an indication of a capability of the UE to change beams within a time period.

In an aspect, one or more of the base stations 102 may include a base station (BS) beam control component 120 that switches a transmit beam or a receive beam based on a configuration and an indicated symbol. The BS beam control component 120 may include a configuration component 122 configured to transmit a configuration indicating whether a beam switching gap is expected at a first symbol position within a subframe of a physical channel for the UE. The first symbol position may have a first cyclic prefix length that is longer than a second cyclic prefix length of a second symbol position within the subframe of the physical channel for the UE. The BS beam control component 120 may include a gap component 124 configured to determine whether a transmission includes a missing symbol for the beam switching gap based on the configuration and the symbol position of a symbol where a beam switch is scheduled. In some aspects, the BS beam control component 120 may optionally include a beam switching component 126 configured to change beams during a cyclic prefix of the symbol where the beam switch is scheduled or during the missing symbol based on the determination. In some implementations, the BS beam control component 120 may optionally include a capability component configured to receive an indication of a capability of the UE to change beams within a time period.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing (SCS) and symbol length/duration are a function of the numerology. The SCS may be equal to $2^\mu*15$ kHz, where μ is the numerology 0 to 5. As such, the numerology μ=0 has a subcarrier spacing of 15 kHz and the numerology μ=5 has a SCS of 480 kHz. The available numerologies may be expanded to include larger SCS (e.g., μ=6 has a SCS of 960 kHz and μ=7 has a SCS of 1920 kHz). The symbol length/duration is inversely related to the SCS. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

The following table (Table 1) includes an SCS, cyclic prefix time (Tcp), and symbol time/duration (Tsymb) for various numerologies.

TABLE 1

| μ | 0 | 1 | 2 | 3 | 4 | 5 | 6 | 7 |
|---|---|---|---|---|---|---|---|---|
| SCS (kHz) | 15 | 30 | 60 | 120 | 240 | 480 | 960 | 1920 |
| Tcp (ns) | 4687.5 | 2343.8 | 1171.9 | 585.9 | 293.0 | 146.5 | 73.2 | 36.6 |
| Tsymb (ns) | 66666.7 | 33333.3 | 16666.7 | 8333.3 | 4166.7 | 2083.3 | 1041.7 | 520.8 |

In an aspect, the symbol time for the number of symbols in a subframe may not equal the full 1 ms length of the subframe. For example, for μ=4 a subframe may include 16 slots of 14 symbols, for a total symbol time of approximately 933,340.8 ns and a total CP time of 65,632 ns. This may leave approximately 1027.2 ns leftover. The leftover time may be allocated to a CP of one or more symbols. For instance, the first symbol in a subframe (index l=0) and a first symbol after the middle of the subframe (index l=$7(2^\mu)$)) may have a longer CP. These longer CPs may occur every 0.5 ms. The following table includes the longer CP for various numerologies.

| μ | 0 | 1 | 2 | 3 | 4 | 5 | 6 | 7 |
|---|---|---|---|---|---|---|---|---|
| SCS (kHz) | 15 | 30 | 60 | 120 | 240 | 480 | 960 | 1920 |
| Tcp every 0.5 ms (ns) | 5208.3 | 2864.6 | 1692.7 | 1106.8 | 813.8 | 667.3 | 594.1 | 557.5 |
| Tsymb (ns) | 66666.7 | 33333.3 | 16666.7 | 8333.3 | 4166.7 | 2083.3 | 1041.7 | 520.8 |

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
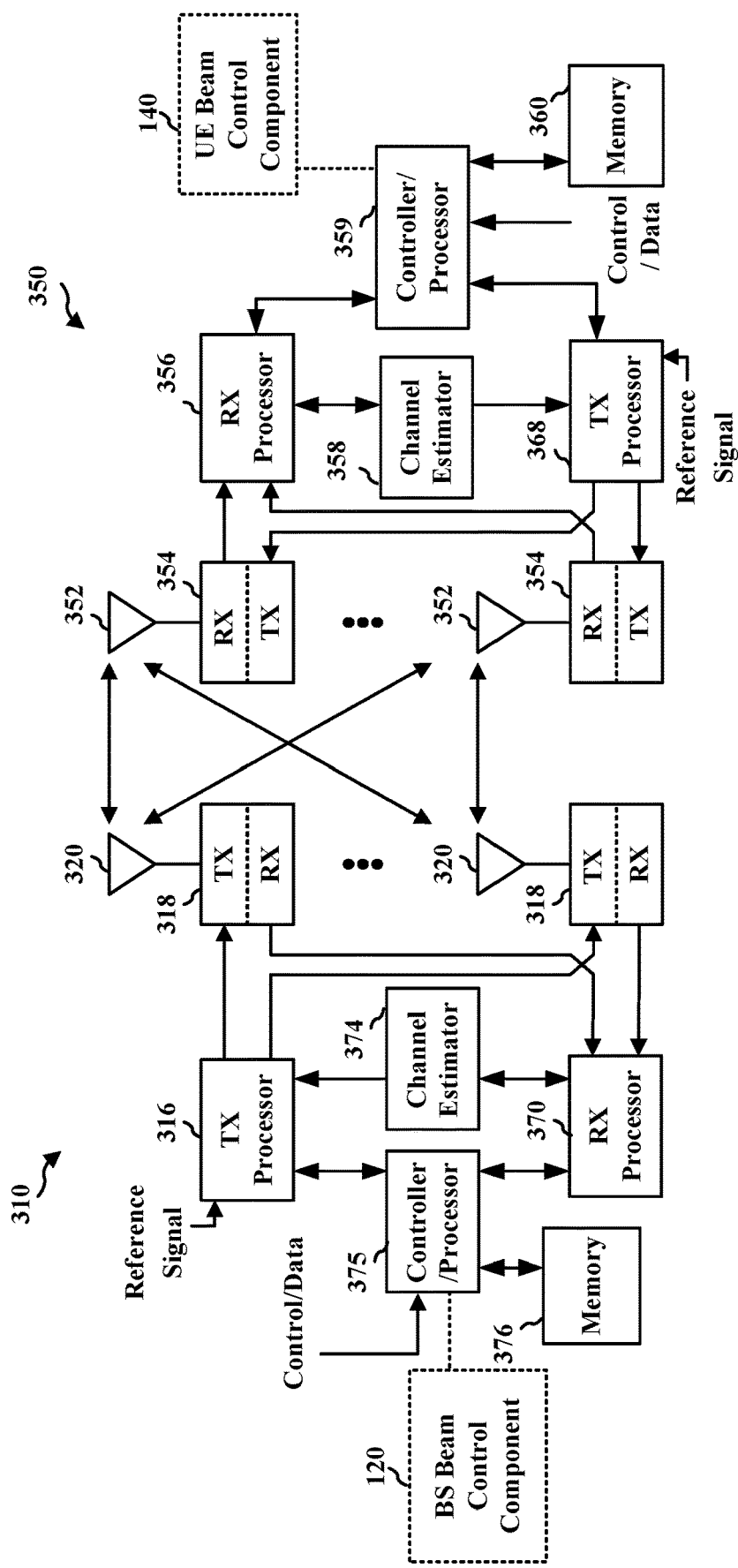
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE beam control component 140 of FIG. 1.

At least one of the TX processor 316, the RX processor 370, and the controller/processor 375 may be configured to perform aspects in connection with the BS beam control component 120 of FIG. 1.

FIG. 4 is a diagram 400 illustrating an example beam switching operation. A base station and/or a UE may have a beam switching time 410 for changing from a first beam 420 to a second beam 430. For example, the beam switching time 410 may allow the base station 102 and/or the UE 104 to change antenna parameters. In an aspect, the beam switching time 410 may be relatively consistent for different frequencies and SCSs. For example, the beam switching time 410 may be on the order of 100 nanoseconds. In an aspect, the UE 104 may transmit an indication of a capability of the UE to change beams within a time period (e.g., the beam switching time 410).

For each beam 420, 430, the UE 104 and/or the base station 102 may transmit or receive a series of symbols 440, 450. Each symbol 440, 450 may include a cyclic prefix (CP) 442, 452. As discussed above with respect to FIGS. 2A-2D, the duration of the symbol 440 and the CP 442 depends on the numerology. As indicated above in table 1, numerologies $\mu=0$ to $\mu=5$ have a normal CP duration that may be greater than the beam switching time 410. Accordingly, in some implementations of NR releases 15 and 16, the beam switching time 410 may occur during a first CP 452 of the second beam 430. The symbol 450 may be transmitted during the symbol time without interruption due to the beam switching.

FIG. 5 is a diagram 500 illustrating an example beam switching operation for a higher numerology or SCS. For instance, numerologies greater than 5 may be utilized at higher frequencies to allow higher throughput. A base station and/or a UE may have a beam switching time 410 for changing from a first beam 520 to a second beam 530. As noted above, as the SCS increases, the duration of symbols decreases. Accordingly, although the beam switching time 410 may be relatively the same at the higher numerology or SCS, the symbol duration and the CP duration may be relatively shorter. As indicated above in Table 1, the numerologies $\mu=6$ and $\mu=7$, as well as any greater numerologies, may include symbols 540, 550 that have a duration of a CP 542, 552 that is less than a beam switching time 410 of approximately 100 nanoseconds. Accordingly, the beam switching time 410 may not occur entirely within the first CP of the second beam 530.

One approach to switching beams when the beam switching time is greater than the CP duration is to skip a symbol during a transmission. For example, one or more missing symbols 560 and corresponding CPs may be skipped between the first beam 520 and the second beam 530. The missing symbol 560 may provide a sufficient gap in the transmission for the UE 104 and/or the base station 102 to switch beams. In an aspect, however, skipping a symbol may reduce throughput because the skipped symbol does not carry any information.

Figure 6:
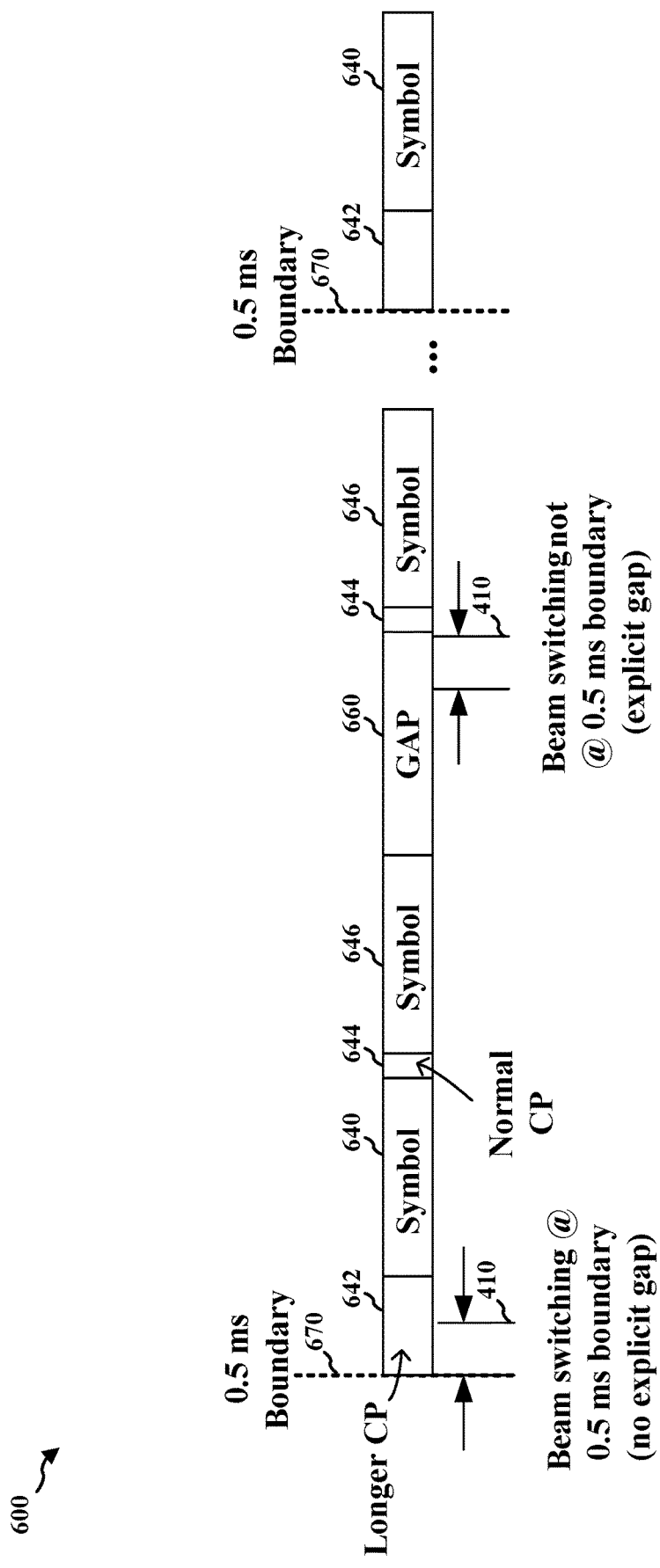
FIG. 6 is a diagram of an example beam switching operation using a configuration based on symbol positions.

FIG. 6 is a diagram 600 illustrating an example beam switching operation utilizing a longer CP. As discussed above regarding FIGS. 2A-2D, the sum of the symbol duration and the CP duration times the number of symbols in a subframe may be less than the 1 ms duration of the subframe. In some implementations of NR release 15 and 16, the extra time is allocated to a longer CP 642 of a first symbol 640 at a first symbol position within the subframe and to a longer CP 642 of a first symbol following the middle of the subframe. In other words, the longer CP 642 may follow a 0.5 ms boundary 670. The longer CP 642 may be longer than the normal CP 644 of other symbols in a second symbol position of the subframe, but the longer CP 642 may also be considered a normal CP in contrast to an extended CP. As indicated above in table 2, the longer CP 642 may be greater than the beam switching time 410 of approximately 100 ns for numerologies $\mu=0$ through at least $\mu=7$. In an aspect, where the beam switch occurs at a symbol having a longer CP 642, a missing symbol 560 may be avoided and the beam switching time 410 may occur during the longer CP 642. If the beam switch occurs at a symbol 646 with a normal CP 644, a gap 660 may be created using a skipped symbol 560. The beam switching time 410 may occur during the gap 660.

Further, although the extra time within a subframe may be allocated to the longer CP 642 for the first symbol 640 after the 0.5 ms boundary 670, in an aspect, the extra time may be allocated to other symbols. For example, the extra time may be allocated to the CP of two or more symbols following the 0.5 ms boundary such that multiple consecutive symbols have a longer CP. In such an implementation, the duration of each of the longer CPs may not be as great as indicated in Table 2, but may still be greater than the beam switching time 410.

In an aspect, the base station 102 may provide the UE 104 with a configuration for determining whether a missing symbol 560 or a gap 660 is expected at the first symbol position (e.g., symbol 640) within a subframe. The subframe may be for a physical channel such as PDCCH, PDSCH, PUCCH, or PUSCH. The first symbol position may have a CP 642 with a first cyclic prefix length that is longer than a second cyclic prefix length (e.g., of CP 644) for a second symbol position (e.g., symbol 646) of the subframe. The configuration may indicate whether a missing symbol 560 is used to create a gap 660 at the symbol position. In an aspect, the configuration may be based on a capability of the UE 104 and/or the base station 102. For instance, if the beam switching time 410 for either the UE 104 or the base station 102 is greater than the duration of the longer CP 642, the configuration may indicate a missing symbol 560. In contrast, if the beam switching time 410 for both the UE 104 and the base station 102 is less than the duration of the longer CP 642, the configuration may indicate that a missing symbol 560 is not expected at the first symbol position. In an aspect, the configuration may further indicate whether a missing symbol 560 or gap 660 is expected at the second symbol position (e.g., symbol 646) within the subframe. For instance, if the beam switching time 410 for either the UE 104 or the base station 102 is less than the duration of the normal CP 644, the configuration may indicate that no missing symbol 560 is expected (i.e., the beam switching time 410 may occur during the normal CP 644). Accordingly, the base station 102 and the UE 104 may determine whether a transmission includes a missing symbol for a beam switching gap based on the configuration and a symbol position of a symbol where a beam switch is scheduled.

Figure 7:
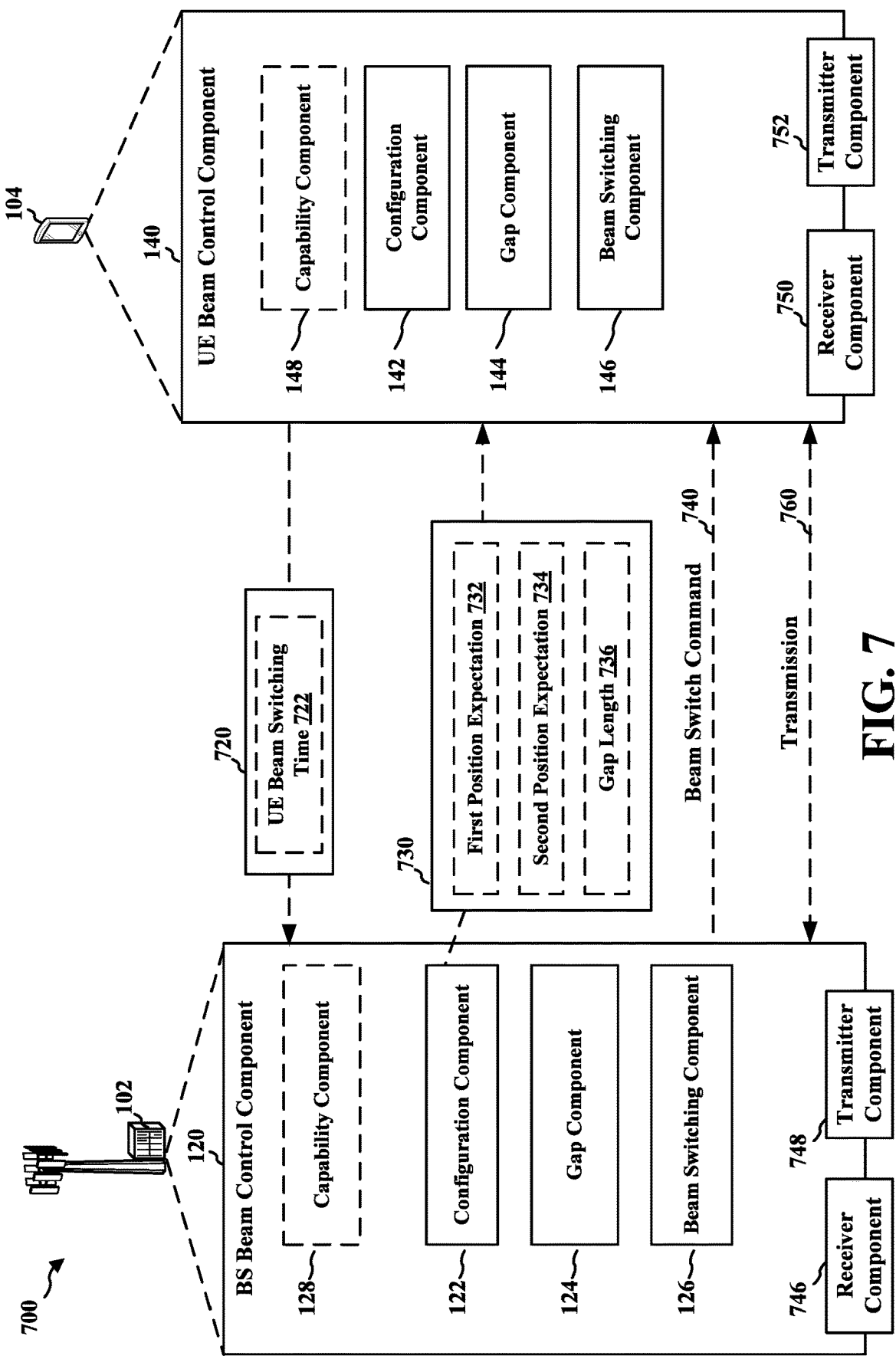
FIG. 7 is a diagram of example communications and components of a base station and a UE.

FIG. 7 is a diagram 700 illustrating example communications and components of a base station 102 and a UE 104. The UE 104 may include the UE beam control component 140. The base station 102 may include the BS beam control component 120.

The base station 102 may include a receiver component 746, which may include, for example, a radio frequency (RF) receiver for receiving the signals described herein. The base station 102 may include a transmitter component 748, which may include, for example, an RF transmitter for transmitting the signals described herein. In an aspect, the receiver component 746 and the transmitter component 748 may be collocated in a transceiver.

As discussed above regarding FIG. 1, the UE 104 may include the UE beam control component 140 including the configuration component 142, the gap component 144, the beam switching component 146, and the capability component 148. The UE 104 may also include a receiver component 750 and a transmitter component 752. The receiver component 750 may include, for example, a RF receiver for receiving the signals described herein. The transmitter component 752 may include for example, an RF transmitter for transmitting the signals described herein. In an aspect, the receiver component 750 and the transmitter component 752 may be collocated in a transceiver.

The capability component 148 may transmit a UE capability message 720 including an indication of a capability of the UE to change beams within a time period. For example, the UE capability message 720 may include a UE beam switching time 722. The UE beam switching time 722 may be based on hardware capabilities of the UE 104. The UE capability message 720 may be, for example, an RRC configuration message. The capability component 128 at the base station 102 may receive the UE capability message 720 and determine the UE beam switching time 722.

The configuration component 122 at the BS beam control component 120 may determine a configuration of the UE 104 for beam switching. In particular, the configuration component 122 may determine whether a beam switching gap 660 is to be expected at either a first symbol position (e.g., symbol 640) or a second symbol position (e.g., symbol 646) of a subframe. The configuration may apply to one or more SCSs, bandwidth parts (BWPs), or channels. For example, the configuration may apply when the SCS is greater than a threshold (e.g., numerology μ=6 or greater). As another example, a BWP configuration may include a numerology, so the beam switching configuration may be tied to the BWP. In another example, the beam switching configuration may depend on a physical channel. For instance, a control channel may use a beam switching gap whereas a data channel may perform the beam switch during a CP.

The configuration component 122 may transmit a configuration message 730 indicating whether the beam switching gap is expected at a first symbol position within a subframe of a physical channel for the UE. For instance, the configuration message 730 may include a first position expectation 732. In some implementations, the configuration message 730 may include a second position expectation 734 that indicates whether the beam switching gap is expected at a second symbol position within the subframe of the physical channel for the UE. Where a beam switching gap 660 is expected, the configuration message 730 may include a gap length 736 indicating a length of the beam switching gap 660, which may be the same or different for the first symbol position and the second symbol position. The configuration component 142 at the UE beam control component 140 may receive the configuration message 730 and extract the first position expectation 732, the second position expectation 734, and/or the gap length 736.

The base station 102 may transmit a beam switch command 740 to the UE 104. The beam switch command 740 may be, for example, a MAC-CE or a DCI. The beam switch command 740 may indicate an update to a transmission configuration indicator (TCI) state for downlink transmissions or a spatial relation indicator (SRI). The beam switch may be applicable at a specific symbol, which may be determined based on the beam switch command. For example, the symbol for the beam switch may be based on one or more of a time domain resource allocation, a UE time duration for quasi-co-location (QCL), and/or an acknowledgment of the beam switch command, and an offset.

The gap component 144 at the UE beam control component 140 and the gap component 124 at the BS beam control component 120 may each determine whether a transmission 760 includes a missing symbol for the beam switching gap 660 based on the configuration and the symbol position of a symbol where a beam switch is scheduled. For example, the gap component 124, 144 may indicate that a beam switching gap is will occur at the symbol where the beam switch is scheduled and that the transmission 760 includes a missing symbol. Alternatively, the gap component 124, 144 may indicate that no beam switching gap will occur and that the beam switch may occur during a CP of the symbol where the beam switch is scheduled. The gap component 124, 144 may provide the determination to the respective beam switching component 126, 146 to perform the beam switch at the indicated time.

Figure 8:
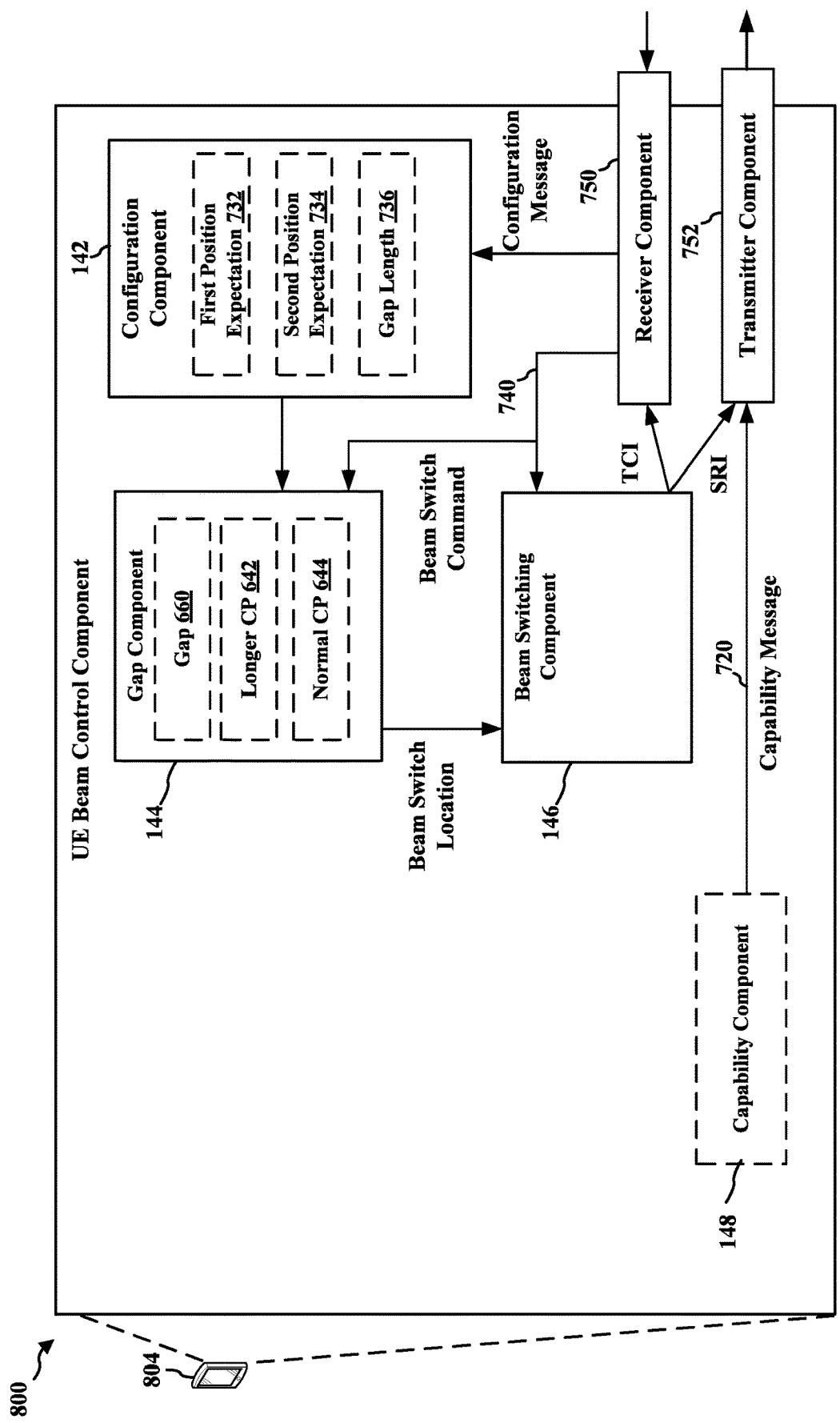
FIG. 8 is a conceptual data flow diagram illustrating the data flow between different means/components in an example UE.

FIG. 8 is a conceptual data flow diagram 800 illustrating the data flow between different means/components in an example UE 804, which may be an example of the UE 104 including the UE beam control component 140.

The receiver component 750 may receive downlink signals including the configuration message 730, the beam switch command 740, and downlink transmissions 760. The receiver component 750 may pass the configuration message 730 to the configuration component 142. The receiver component 750 may pass the beam switch command to the gap component 144. The receiver component 750 may pass the transmission 760 to higher layers.

The configuration component 142 may receive the configuration message 730 via the receiver component 750. The configuration component 142 may decode the configuration message 730 and extract one or more parameters such as the first position expectation 732. In some implementations, the configuration component 142 may extract the second position expectation and/or the gap length 736. The configuration component 142 may provide the extracted configuration to the gap component 144.

The gap component 144 may receive the configuration from the configuration component 142. The gap component 144 may receive the beam switch command 740 via the receiver component 750. The gap component 144 may determine whether the transmission 760 includes a missing symbol for the beam switching gap based on the configuration and the symbol position of a symbol where a beam switch is scheduled. The gap component 144 may determine whether the beam switching time 410 is to occur during the gap 660, the longer CP 642, or the normal CP 644. The gap component 144 may provide the beam switch location to the beam switching component 146.

The beam switching component 146 may receive the beam switch location from the gap component 144. The beam switching component 146 may receive the beam switch command 740 via the receiver component 750. The beam switching component 146 may determine new beam information (e.g., a TCI or SRI) from the beam switch command 740. The beam switch component 146 may configure the receiver component 750 with the new TCI or the transmitter component 752 with the new SRI to change the beam for the transmission 760.

In some implementations, the capability component 148 may transmit the UE capability message 720 to the base station 102 via the transmitter component 752. The beam switching configuration received from the base station may be based on the UE capability message 720.

Figure 9:
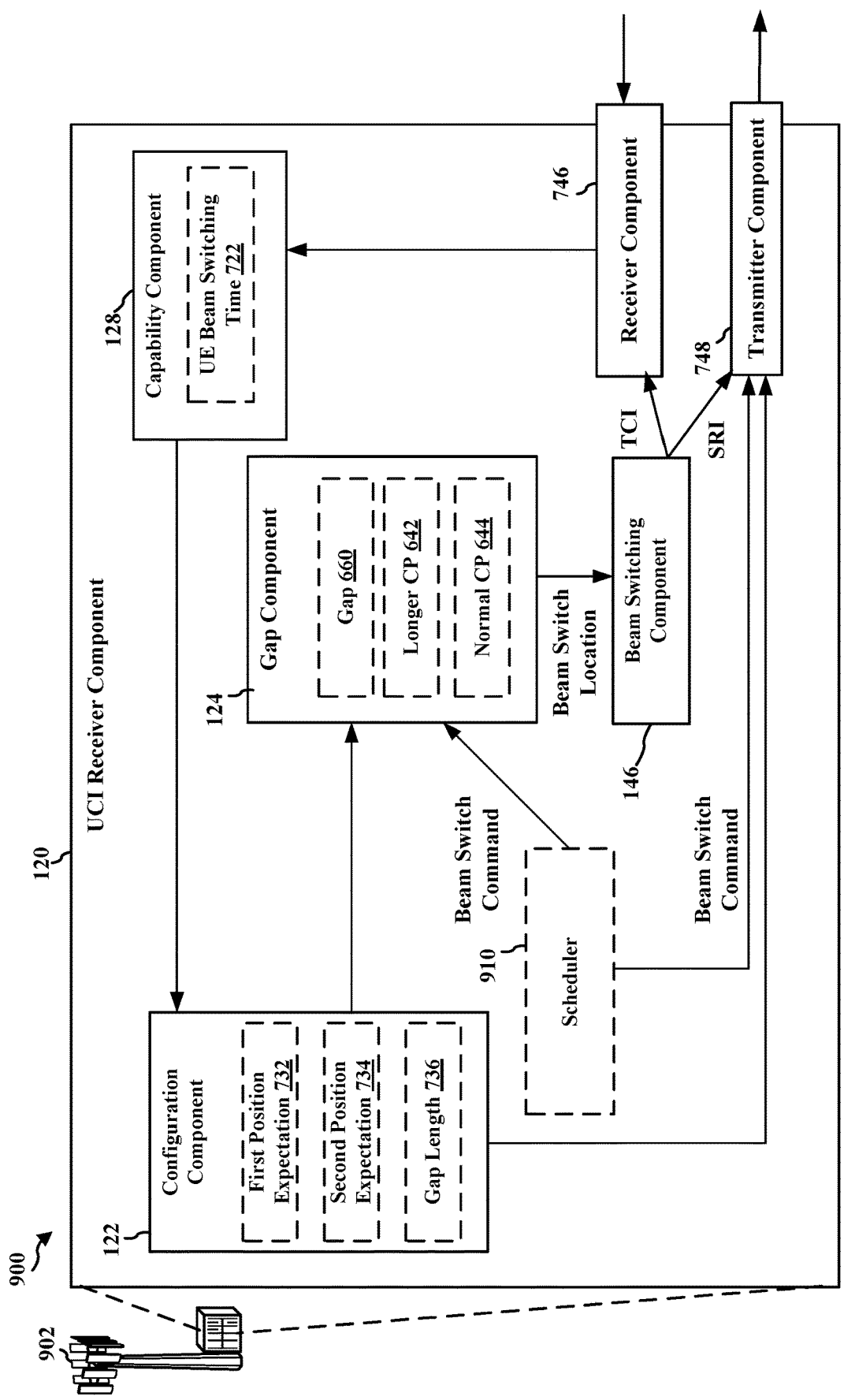
FIG. 9 is a conceptual data flow diagram illustrating the data flow between different means/components in an example base station.

FIG. 9 is a conceptual data flow diagram 900 illustrating the data flow between different means/components in an example base station 902, which may be an example of the base station 102 and include the BS beam control component 120.

The receiver component 746 may receive uplink signals such as a UE capability message 720. The receiver component 750 may pass the UE capability message 720 to the capability component 128.

In some implementations, the capability component 128 may decode the UE capability message 720 and extract UE capability information such as UE beam switching time 722 from the UE capability message 720. The capability component 128 may provide the UE capabilities to the configuration component 122.

The configuration component 122 may determine a beam switching configuration for the UE 104. For example, the beam switching configuration may be based on capabilities of the base station 102 and the UE 104. For example, the beam switching configuration may depend on a maximum beam switching time of the base station 102 and the UE 104. The configuration component 122 may determine a first position expectation 732, a second position expectation 734, and/or a gap length 736 based on the capabilities. In some implementations, the second position expectation 734 and/or the gap length 736 may be set by a standard or regulation. For instance, in some implementations, the second position expectation may always be to expect a beam switching gap for a transmission with a SCS greater than a threshold. The configuration component 122 may generate the configuration message 730 including the first position expectation 732. In some implementations, the configuration component 122 may include the second position expectation and/or the gap length 736 in the configuration message 730. The configuration component 142 may transmit the configuration message 730 via the transmitter component 748. The configuration component 142 may also provide the configuration to the gap component 124.

The gap component 124 may receive the configuration from the configuration component 142. The gap component 124 may receive an internal beam switch command from a scheduler 910 that transmits the beam switch command 740 to the UE 104. The gap component 124 may determine whether the transmission 760 includes a missing symbol for the beam switching gap based on the configuration and the symbol position of a symbol where a beam switch is scheduled. The gap component 124 may determine whether the beam switching time 410 is to occur during the gap 660, the longer CP 642, or the normal CP 644. The gap component 124 may provide the beam switch location to the beam switching component 126.

The beam switching component 126 may receive the beam switch location from the gap component 124. The beam switching component 126 may determine new beam information (e.g., a TCI or SRI) from the beam switch command. The beam switch component 126 may configure the receiver component 746 with the new SRI or the transmitter component 748 with the new TCI to change the beam for the transmission 760.

Figure 10:
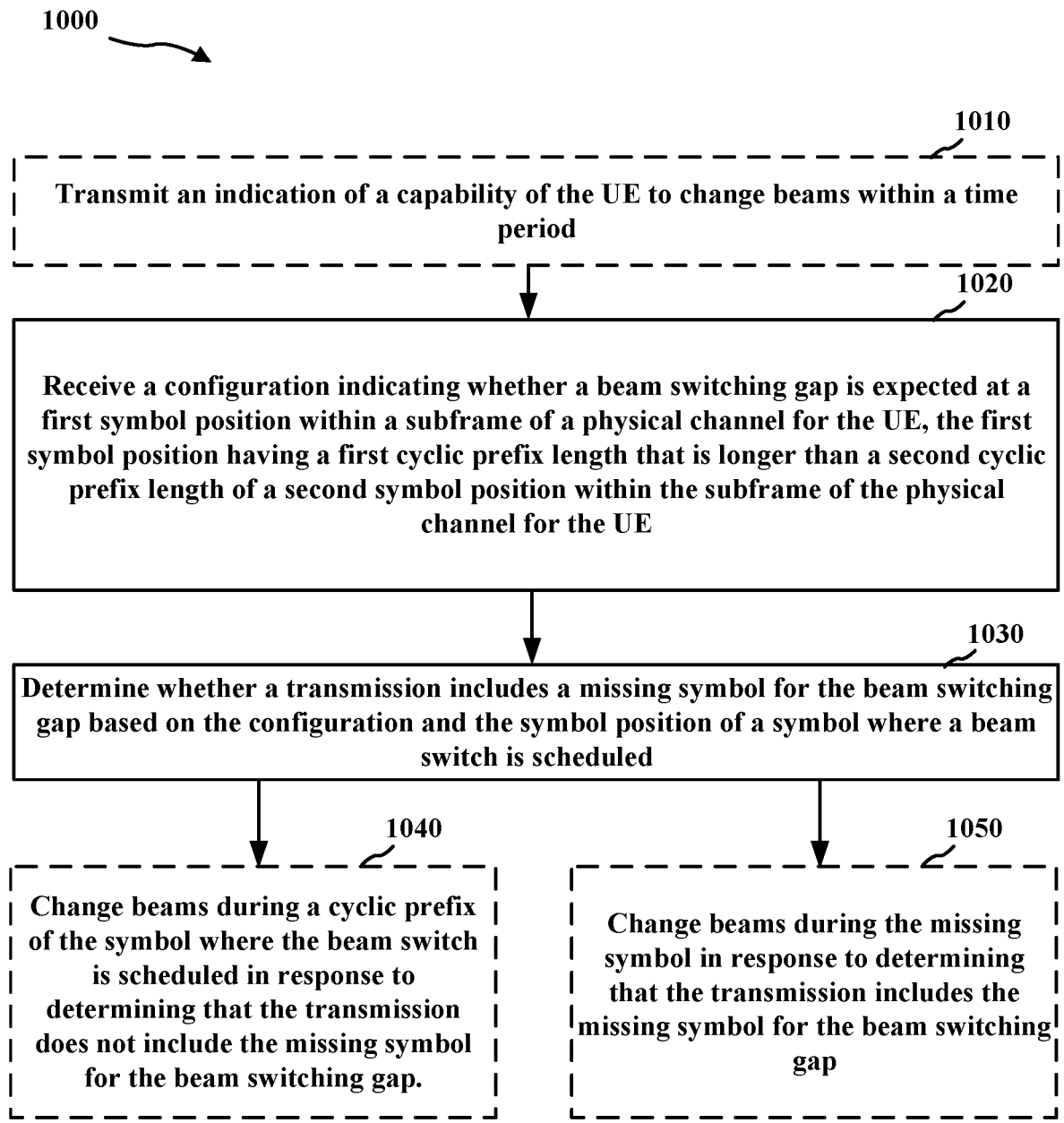
FIG. 10 is a flowchart of an example of a method of beam switching at a UE.

FIG. 10 is a flowchart of an example method 1000 for switching beams at a UE. The method 1000 may be performed by a UE (such as the UE 104, which may include the memory 360 and which may be the entire UE 104 or a component of the UE 104 such as the UE beam control component 140, TX processor 368, the RX processor 356, or the controller/processor 359). The method 1000 may be performed by the UE beam control component 140 in communication with the BS beam control component 120 of the base station 102.

At block 1010, the method 1000 may optionally transmitting an indication of a capability of the UE to change beams within a time period. In an aspect, for example, the UE 104, the TX processor 368 and/or the controller/processor 359 may execute the UE beam control component 140 and/or the capability component 148 to transmit an indication (e.g., UE capability message 720) of a capability of the UE 104 to change beams within a time period (e.g. beam switching time 410). For example, the UE capability message 720 may include a UE beam switching time 722. The UE 104 may transmit the UE capability message 720 as an RRC message. Accordingly, the UE 104, the TX processor 368, and/or the controller/processor 359 executing the UE beam control component 140 and/or the capability component 148 may provide means for transmitting an indication of a capability of the UE to change beams within a time period.

At block 1020, the method 1000 may include receiving a configuration indicating whether a beam switching gap is expected at a first symbol position within a subframe of a physical channel for the UE, the first symbol position having a first cyclic prefix length that is longer than a second cyclic prefix length of a second symbol position within the subframe of the physical channel for the UE. In an aspect, for example, the UE 104, the RX processor 356 and/or the controller/processor 359 may execute the UE beam control component 140 and/or the configuration component 142 to receive the configuration (e.g., configuration message 730) indicating whether a beam switching gap 660 is expected at a first symbol position (e.g., symbol 640) within a subframe of a physical channel for the UE 104. For example, the configuration message 730 may include the first position expectation 732. The first symbol position may a first cyclic prefix length (e.g., longer CP 642) that is longer than a second cyclic prefix length (e.g., normal CP 644) of a second symbol position (e.g., symbol 646) within the subframe of the physical channel for the UE 104. In an aspect, the first symbol position occurs at one or more symbols 640 after a 0.5 millisecond boundary 670 at a start of the subframe and at a middle of the subframe. For instance, the longer CP 642 may occur at symbol indices 0 and 7($2^H$). In some implementations, the configuration may indicate whether the beam switching gap is expected at the second symbol position of the transmission. For example, the configuration message 730 may include the second position expectation 734. In other implementations, the beam switching gap may be expected at the second symbol position regardless of the configuration message 730. In some implementations, the configuration message 730 may include the gap length 736 that indicates a length of the gap 660 (e.g., a number of symbols). The beam switching gap for the first symbol position may be the same as the beam switching gap for the second symbol position. Alternatively, the configuration message 730 may include a separate gap length for each symbol position. Accordingly, the UE 104, the RX processor 356, and/or the controller/processor 359 executing the UE beam control component 140 and/or the configuration component 142 may provide means for receiving a configuration indicating whether a beam switching gap is expected at a first symbol position within a subframe of a physical channel for the UE, the first symbol position having a first cyclic prefix length that is longer than a second cyclic prefix length of a second symbol position within the subframe of the physical channel for the UE.

At block 1030, the method 1000 may include determining whether a transmission includes a missing symbol for the beam switching gap based on the configuration and the symbol position of a symbol where a beam switch is scheduled. In an aspect, for example, the UE 104, the TX processor 368 and/or the controller/processor 359 may execute the UE beam control component 140 and/or the gap component 144 to determine whether the transmission 760 includes a missing symbol 560 for the beam switching gap 660 based on the configuration (e.g., configuration message 730) and the symbol position of the symbol where a beam switch is scheduled. In an aspect, the configuration may be applicable when the transmission 760 has a sub-carrier spacing greater than a threshold value. In another aspect, the configuration may be applicable to a bandwidth part for the transmission 760. In some implementations, the physical channel may be one of a control channel or a data channel. The gap component 144 may determine the applicable configuration based on the properties of the transmission 760. Accordingly, the UE 104, the TX processor 368, and/or the controller/processor 359 executing the UE beam control component 140 and/or the gap component 144 may provide means for determining whether a transmission includes a missing symbol for the beam switching gap based on the configuration and the symbol position of a symbol where a beam switch is scheduled.

At block 1040, the method 1000 may optionally include changing beams during a cyclic prefix of the symbol where the beam switch is scheduled in response to determining that the transmission does not include the missing symbol for the beam switching gap. In an aspect, for example, the UE 104, the TX processor 368 and/or the controller/processor 359 may execute the UE beam control component 140 and/or the beam switching component 146 to change beams during a cyclic prefix (e.g., longer CP 642) of the symbol (e.g., symbol 640) where the beam switch is scheduled in response to determining that the transmission does not include the missing symbol for the beam switching gap. Accordingly, the UE 104, the TX processor 368, and/or the controller/processor 359 executing the UE beam control component 140 and/or the beam switching component 146 may provide means for changing beams during a cyclic prefix of the symbol where the beam switch is scheduled in response to determining that the transmission does not include the missing symbol for the beam switching gap.

At block 1050, the method 1000 may optionally include changing beams during the missing symbol in response to determining that the transmission includes the missing symbol for the beam switching gap. In an aspect, for example, the UE 104, the TX processor 368 and/or the controller/processor 359 may execute the UE beam control component 140 and/or the beam switching component 146 to change beams during the missing symbol in response to determining that the transmission includes the missing symbol for the beam switching gap. Accordingly, the UE 104, the TX processor 368, and/or the controller/processor 359 executing the UE beam control component 140 and/or the beam switching component 146 may provide means for changing beams during the missing symbol in response to determining that the transmission includes the missing symbol for the beam switching gap.

Figure 11:
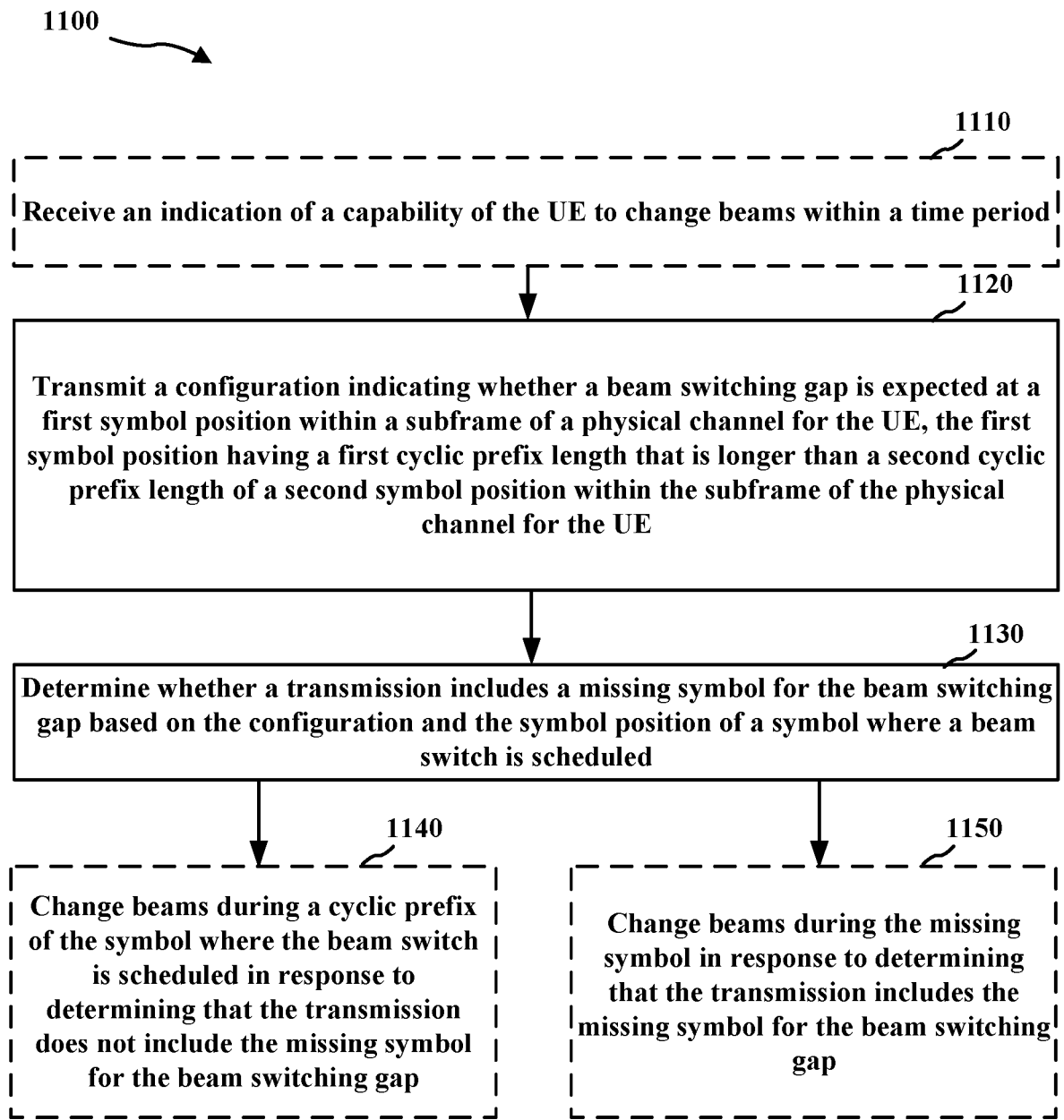
FIG. 11 is a flowchart of an example of a method of beam switching at a base station.

FIG. 11 is a flowchart of an example method 1100 of switching beams at a base station. The method 1100 may be performed by a base station (such as the base station 102, which may include the memory 376 and which may be the entire base station 102 or a component of the base station 102 such as the BS beam control component 120, TX processor 316, the RX processor 370, or the controller/processor 375). The method 1100 may be performed by the BS beam control component 120 in communication with the UE beam control component 140 of the UE 104.

At block 1110, the method 1100 may optionally include receiving an indication of a capability of the UE to change beams within a time period. In an aspect, for example, the base station 102, the controller/processor 375, and/or the RX processor 370 may execute the BS beam control component 120 and/or the capability component 128 to receive an indication of a capability of the UE to change beams within a time period. Accordingly, the base station 102, the controller/processor 375, and/or the RX processor 370 executing the BS beam control component 120 and/or the capability component 128 may provide means for receiving an indication of a capability of the UE to change beams within a time period.

At block 1120, the method 1100 may include transmitting a configuration indicating whether a beam switching gap is expected at a first symbol position within a subframe of a physical channel for a UE, the first symbol position having a first cyclic prefix length that is longer than a second cyclic prefix length of a second symbol position within the subframe of the physical channel for the UE. In an aspect, for example, the base station 102, the controller/processor 375, and/or the TX processor 316 may execute the BS beam control component 120 and/or the configuration component 122 to transmit a configuration (e.g., configuration message 730) indicating whether a beam switching gap 660 is expected at a first symbol position (e.g., symbol 640) within a subframe of a physical channel for the UE 104. The first symbol position may have a first cyclic prefix length (e.g., longer CP 642) that is longer than a second cyclic prefix length (e.g., normal CP 644) of a second symbol position (e.g., symbol 646) within the subframe of the physical channel for the UE 104. In an aspect, the first symbol position occurs at one or more symbols 640 after a 0.5 millisecond boundary 670 at a start of the subframe and at a middle of the subframe. For instance, the longer CP 642 may occur at symbol indices 0 and $7(2^H)$. In some implementations, the configuration may indicate whether the beam switching gap is expected at the second symbol position of the transmission. For example, the configuration message 730 may include the second position expectation 734. In other implementations, the beam switching gap may be expected at the second symbol position regardless of the configuration message 730. In some implementations, the configuration message 730 may include the gap length 736 that indicates a length of the gap 660 (e.g., a number of symbols). The beam switching gap for the first symbol position may be the same as the beam switching gap for the second symbol position. Alternatively, the configuration message 730 may include a separate gap length for each symbol position. Accordingly, the base station 102, the controller/processor 375, and/or the TX processor 316 executing the BS beam control component 120 and/or the configuration component 122 may provide means for transmitting a configuration indicating whether a beam switching gap is expected at a first symbol position within a subframe of a physical channel for a UE, the first symbol position having a first cyclic prefix length that is longer than a second cyclic prefix length of a second symbol position within the subframe of the physical channel for the UE.

At block 1130, the method 1100 may include determining whether a transmission includes a missing symbol for the beam switching gap based on the configuration and the symbol position of a symbol where a beam switch is scheduled. In an aspect, for example, the base station 102, the controller/processor 375, and/or the RX processor 370 may execute the BS beam control component 120 and/or the gap component 124 to determine whether a transmission includes a missing symbol for the beam switching gap based on the configuration and the symbol position of a symbol where a beam switch is scheduled. In an aspect, the configuration may be applicable when the transmission 760 has a sub-carrier spacing greater than a threshold value. In another aspect, the configuration may be applicable to a bandwidth part for the transmission 760. In some implementations, the physical channel may be one of a control channel or a data channel. The gap component 144 may determine the applicable configuration based on the properties of the transmission 760. Accordingly, the base station 102, the controller/processor 375, and/or the RX processor 370 executing the BS beam control component 120 and/or the gap component 124 may provide means determining whether a transmission includes a missing symbol for the beam switching gap based on the configuration and the symbol position of a symbol where a beam switch is scheduled.

At block 1140, the method 1100 may optionally include changing beams during a cyclic prefix of the symbol where the beam switch is scheduled in response to determining that the transmission does not include the missing symbol for the beam switching gap. In an aspect, for example, the base station 102, the controller/processor 375, and/or the RX processor 370 may execute the BS beam control component 120 and/or the beam switching component 126 to change beams during a cyclic prefix of the symbol where the beam switch is scheduled in response to determining that the transmission does not include the missing symbol for the beam switching gap. Accordingly, the base station 102, the controller/processor 375, and/or the RX processor 370 executing the BS beam control component 120 and/or the beam switching component 126 may provide means for changing beams during a cyclic prefix of the symbol where the beam switch is scheduled in response to determining that the transmission does not include the missing symbol for the beam switching gap.

At block 1150, the method 1100 may optionally include changing beams during the missing symbol in response to determining that the transmission includes the missing symbol for the beam switching gap. In an aspect, for example, the base station 102, the controller/processor 375, and/or the RX processor 370 may execute the BS beam control component 120 and/or the beam switching component 126 to change beams during the missing symbol in response to determining that the transmission includes the missing symbol for the beam switching gap. Accordingly, the base station 102, the controller/processor 375, and/or the RX processor 370 executing the BS beam control component 120 and/or the beam switching component 126 may provide means for changing beams during the missing symbol in response to determining that the transmission includes the missing symbol for the beam switching gap.

The following provides an overview of aspects of the present disclosure:

Aspect 1: A method of wireless communication, comprising, at a user equipment (UE): receiving a configuration indicating whether a beam switching gap is expected at a first symbol position within a subframe of a physical channel for the UE, the first symbol position having a first cyclic prefix length that is longer than a second cyclic prefix length of a second symbol position within the subframe of the physical channel for the UE; and determining whether a transmission includes a missing symbol for the beam switching gap based on the configuration and the symbol position of a symbol where a beam switch is scheduled.

Aspect 2: The method of Aspect 1, wherein the first symbol position occurs at one or more symbols after a 0.5 millisecond boundary at a start of the subframe and at a middle of the subframe.

Aspect 3: The method of any of Aspect 1 or 2, wherein the configuration indicates whether the beam switching gap is expected at the second symbol position of the transmission.

Aspect 4: The method of any of Aspects 1 or 2, wherein a beam switching gap is expected at the second symbol position of the transmission regardless of the configuration.

Aspect 5: The method of any of Aspects 1-4, further comprising changing beams during a cyclic prefix of the symbol where the beam switch is scheduled in response to determining that the transmission does not include the missing symbol for the beam switching gap.

Aspect 6: The method of any of Aspects 1-4, further comprising changing beams during the missing symbol in response to determining that the transmission includes the missing symbol for the beam switching gap.

Aspect 7: The method of any of Aspects 1-6, wherein the beam switching gap for the first symbol position is the same as the beam switching gap for the second symbol position.

Aspect 8: The method of any of Aspects 1-6, wherein the beam switching gap for the first symbol position is different than the beam switching gap for the second symbol position.

Aspect 9: The method of any of Aspects 1-8, further comprising transmitting an indication of a capability of the UE to change beams within a time period, wherein the configuration is based on the capability.

Aspect 10: The method of any of Aspects 1-9, wherein the configuration is applicable when the transmission has a sub-carrier spacing greater than a threshold value.

Aspect 11: The method of any of Aspects 1-10, wherein the configuration is applicable to a bandwidth part for the transmission.

Aspect 12: The method of any of Aspects 1-11, wherein the physical channel is one of a control channel or a data channel.

Aspect 13: A method of wireless communication, comprising, at a base station: transmitting a configuration indicating whether a beam switching gap is expected at a first symbol position within a subframe of a physical channel for a user equipment (UE), the first symbol position having a first cyclic prefix length that is longer than a second cyclic prefix length of a second symbol position within the subframe of the physical channel for the UE; and determining whether a transmission includes a missing symbol for the beam switching gap based on the configuration and the symbol position of a symbol where a beam switch is scheduled.

Aspect 14: The method of Aspect 13, wherein the first symbol position occurs at one or more symbols after a 0.5 millisecond boundary at a start of a subframe and at a middle of the subframe.

Aspect 15: The method of Aspect 13 or 14, wherein the configuration indicates whether the beam switching gap is expected at the second symbol position of the transmission.

Aspect 16: The method of Aspect 13 or 14, wherein a beam switching gap is expected at the second symbol position of the transmission regardless of the configuration.

Aspect 17: The method of any of Aspects 13-16, further comprising changing beams during a cyclic prefix of the symbol where the beam switch is scheduled in response to determining that the transmission does not include the missing symbol for the beam switching gap.

Aspect 18: The method of any of Aspects 13-16, further comprising changing beams during the missing symbol in response to determining that the transmission includes the missing symbol for the beam switching gap.

Aspect 19: The method of any of Aspects 13-18, wherein the beam switching gap for the first symbol position is the same as the beam switching gap for the second symbol position.

Aspect 20: The method of any of Aspects 13-18, wherein the beam switching gap for the first symbol position is different than the beam switching gap for the second symbol position.

Aspect 21: The method of any of Aspects 13-20, further comprising receiving an indication of a capability of the UE to change beams within a time period, wherein the configuration is based on the capability.

Aspect 22: The method of any of Aspects 13-21, wherein the configuration is applicable when the transmission has a sub-carrier spacing greater than a threshold value.

Aspect 23: The method of any of Aspects 13-22, wherein the configuration is applicable to a bandwidth part for the transmission.

Aspect 24: The method of any of Aspects 13-23, wherein the physical channel is one of a control channel or a data channel.

Aspect 25: An apparatus for wireless communication for a user equipment (UE), comprising: a memory storing computer-executable instructions; and at least one processor coupled to the memory and configured to execute the computer-executable instructions to: receive a configuration indicating whether a beam switching gap is expected at a first symbol position within a subframe of a physical channel for the UE, the first symbol position having a first cyclic prefix length that is longer than a second cyclic prefix length of a second symbol position within the subframe of the physical channel for the UE; and determine whether a transmission includes a missing symbol for the beam switching gap based on the configuration and the symbol position of a symbol where a beam switch is scheduled.

Aspect 26: The apparatus of Aspect 25, wherein the first symbol position occurs at one or more symbols after a 0.5 millisecond boundary at a start of the subframe and at a middle of the subframe.

Aspect 27: The apparatus of Aspect 25 or 26, wherein the configuration indicates whether the beam switching gap is expected at the second symbol position of the transmission.

Aspect 28: The apparatus of Aspect 25 or 26, wherein a beam switching gap is expected at the second symbol position of the transmission regardless of the configuration.

Aspect 29: The apparatus of any of Aspects 25-28, wherein the at least one processor is configured to change beams during a cyclic prefix of the symbol where the beam switch is scheduled in response to determining that the transmission does not include the missing symbol for the beam switching gap.

Aspect 30: The apparatus of any of Aspects 25-28, wherein the at least one processor is configured to change beams during the missing symbol in response to determining that the transmission includes the missing symbol for the beam switching gap.

Aspect 31: The apparatus of any of Aspects 25-30, wherein the beam switching gap for the first symbol position is the same as the beam switching gap for the second symbol position.

Aspect 32: The apparatus of any of Aspects 25-30, wherein the beam switching gap for the first symbol position is different than the beam switching gap for the second symbol position.

Aspect 33: The apparatus of any of Aspects 25-32, wherein the at least one processor is configured to transmit an indication of a capability of the UE to change beams within a time period, wherein the configuration is based on the capability.

Aspect 34: The apparatus of any of Aspects 25-33, wherein the configuration is applicable when the transmission has a sub-carrier spacing greater than a threshold value.

Aspect 35: The apparatus of any of Aspects 25-34, wherein the configuration is applicable to a bandwidth part for the transmission.

Aspect 36: The apparatus of any of Aspects 25-35, wherein the physical channel is one of a control channel or a data channel.

Aspect 37: An apparatus for wireless communication for a base station, comprising: a memory storing computer-executable instructions; and at least one processor coupled to the memory and configured to execute the computer-executable instructions to: transmit a configuration indicating whether a beam switching gap is expected at a first symbol position within a subframe of a physical channel for a user equipment (UE), the first symbol position having a first cyclic prefix length that is longer than a second cyclic prefix length of a second symbol position within the subframe of the physical channel for the UE; and determine whether a transmission includes a missing symbol for the beam switching gap based on the configuration and the symbol position of a symbol where a beam switch is scheduled.

Aspect 38: The apparatus of Aspect 37, wherein the first symbol position occurs at one or more symbols after a 0.5 millisecond boundary at a start of a subframe and at a middle of the subframe.

Aspect 39: The apparatus of Aspect 37 or 38, wherein the configuration indicates whether the beam switching gap is expected at the second symbol position of the transmission.

Aspect 40: The apparatus of Aspect 37 or 38, wherein a beam switching gap is expected at the second symbol position of the transmission regardless of the configuration.

Aspect 41: The apparatus of any of Aspects 37-40, wherein the at least one processor is configured to change beams during a cyclic prefix of the symbol where the beam switch is scheduled in response to determining that the transmission does not include the missing symbol for the beam switching gap.

Aspect 42: The apparatus of any of Aspects 37-40, wherein the at least one processor is configured to change beams during the missing symbol in response to determining that the transmission includes the missing symbol for the beam switching gap.

Aspect 43: The apparatus of any of Aspects 37-42, wherein the beam switching gap for the first symbol position is the same as the beam switching gap for the second symbol position.

Aspect 44: The apparatus of any of Aspects 37-42, wherein the beam switching gap for the first symbol position is different than the beam switching gap for the second symbol position.

Aspect 45: The apparatus of any of Aspects 37-44, wherein the at least one processor is configured to receive an indication of a capability of the UE to change beams within a time period, wherein the configuration is based on the capability.

Aspect 46: The apparatus of any of Aspects 37-45, wherein the configuration is applicable when the transmission has a sub-carrier spacing greater than a threshold value.

Aspect 47: The apparatus of any of Aspects 37-46, wherein the configuration is applicable to a bandwidth part for the transmission.

Aspect 48: The apparatus of any of Aspects 37-47, wherein the physical channel is one of a control channel or a data channel.

Aspect 49: An apparatus for wireless communication for a user equipment (UE), comprising: means for receiving a configuration indicating whether a beam switching gap is expected at a first symbol position within a subframe of a physical channel for the UE, the first symbol position having a first cyclic prefix length that is longer than a second cyclic prefix length of a second symbol position within the subframe of the physical channel for the UE; and means for determining whether a transmission includes a missing symbol for the beam switching gap based on the configuration and the symbol position of a symbol where a beam switch is scheduled.

Aspect 50: The apparatus of Aspect 49, wherein the first symbol position occurs at one or more symbols after a 0.5 millisecond boundary at a start of the subframe and at a middle of the subframe.

Aspect 51: The apparatus of Aspect 49 or 50, wherein the configuration indicates whether the beam switching gap is expected at the second symbol position of the transmission.

Aspect 52: The apparatus of Aspect 49 or 50, wherein a beam switching gap is expected at the second symbol position of the transmission regardless of the configuration.

Aspect 53: The apparatus of any of Aspects 49-52, further comprising means for changing beams during a cyclic prefix of the symbol where the beam switch is scheduled in response to determining that the transmission does not include the missing symbol for the beam switching gap.

Aspect 54: The apparatus of any of Aspects 49-52, further comprising means for changing beams during the missing symbol in response to determining that the transmission includes the missing symbol for the beam switching gap.

Aspect 55: The apparatus of any of Aspects 49-54, wherein the beam switching gap for the first symbol position is the same as the beam switching gap for the second symbol position.

Aspect 56: The apparatus of any of Aspects 49-54, wherein the beam switching gap for the first symbol position is different than the beam switching gap for the second symbol position.

Aspect 57: The apparatus of any of Aspects 49-56, further comprising means for transmitting an indication of a capability of the UE to change beams within a time period, wherein the configuration is based on the capability.

Aspect 58: The apparatus of any of Aspects 49-57, wherein the configuration is applicable when the transmission has a sub-carrier spacing greater than a threshold value.

Aspect 59: The apparatus of any of Aspects 49-58, wherein the configuration is applicable to a bandwidth part for the transmission.

Aspect 60: The apparatus of any of Aspects 49-59, wherein the physical channel is one of a control channel or a data channel.

Aspect 61: An apparatus for wireless communication for a base station, comprising: means for transmitting a configuration indicating whether a beam switching gap is expected at a first symbol position within a subframe of a physical channel for a user equipment (UE), the first symbol position having a first cyclic prefix length that is longer than a second cyclic prefix length of a second symbol position within the subframe of the physical channel for the UE; and means for determining whether a transmission includes a missing symbol for the beam switching gap based on the configuration and the symbol position of a symbol where a beam switch is scheduled.

Aspect 62: The apparatus of Aspect 61, wherein the first symbol position occurs at one or more symbols after a 0.5 millisecond boundary at a start of a subframe and at a middle of the subframe.

Aspect 63: The apparatus of Aspect 61 or 62, wherein the configuration indicates whether the beam switching gap is expected at the second symbol position of the transmission.

Aspect 64: The apparatus of Aspect 61 or 62, wherein a beam switching gap is expected at the second symbol position of the transmission regardless of the configuration.

Aspect 65: The apparatus of any of Aspects 61-64, further comprising means for changing beams during a cyclic prefix of the symbol where the beam switch is scheduled in response to determining that the transmission does not include the missing symbol for the beam switching gap.

Aspect 66: The apparatus of any of Aspects 61-64, further comprising means for changing beams during the missing symbol in response to determining that the transmission includes the missing symbol for the beam switching gap.

Aspect 67: The apparatus of any of Aspects 61-66, wherein the beam switching gap for the first symbol position is the same as the beam switching gap for the second symbol position.

Aspect 68: The apparatus of any of Aspects 61-66, wherein the beam switching gap for the first symbol position is different than the beam switching gap for the second symbol position.

Aspect 69: The apparatus of any of Aspects 61-68, further comprising means for receiving an indication of a capability of the UE to change beams within a time period, wherein the configuration is based on the capability.

Aspect 70: The apparatus of any of Aspects 61-69, wherein the configuration is applicable when the transmission has a sub-carrier spacing greater than a threshold value.

Aspect 71: The apparatus of any of Aspects 61-70, wherein the configuration is applicable to a bandwidth part for the transmission.

Aspect 72: The apparatus of any of Aspects 61-71, wherein the physical channel is one of a control channel or a data channel.

Aspect 73: A non-transitory computer-readable medium storing computer executable code, the code when executed by a processor of a user equipment (UE) causes the processor to: receive a configuration indicating whether a beam switching gap is expected at a first symbol position within a subframe of a physical channel for the UE, the first symbol position having a first cyclic prefix length that is longer than a second cyclic prefix length of a second symbol position within the subframe of the physical channel for the UE; and determine whether a transmission includes a missing symbol for the beam switching gap based on the configuration and the symbol position of a symbol where a beam switch is scheduled.

Aspect 74: The non-transitory computer-readable medium of Aspect 73, wherein the first symbol position occurs at one or more symbols after a 0.5 millisecond boundary at a start of the subframe and at a middle of the subframe.

Aspect 75: The non-transitory computer-readable medium of Aspect 73 or 74, wherein the configuration indicates whether the beam switching gap is expected at the second symbol position of the transmission.

Aspect 76: The non-transitory computer-readable medium of Aspect 73 or 74, wherein a beam switching gap is expected at the second symbol position of the transmission regardless of the configuration.

Aspect 77: The non-transitory computer-readable medium of any of Aspects 73-76, further comprising code to change beams during a cyclic prefix of the symbol where the beam switch is scheduled in response to determining that the transmission does not include the missing symbol for the beam switching gap.

Aspect 78: The non-transitory computer-readable medium of any of Aspects 73-76, further comprising code to change beams during the missing symbol in response to determining that the transmission includes the missing symbol for the beam switching gap.

Aspect 79: The non-transitory computer-readable medium of any of Aspects 73-78, wherein the beam switching gap for the first symbol position is the same as the beam switching gap for the second symbol position.

Aspect 80: The non-transitory computer-readable medium of any of Aspects 73-78, wherein the beam switching gap for the first symbol position is different than the beam switching gap for the second symbol position.

Aspect 81: The non-transitory computer-readable medium of any of Aspects 73-80, further comprising code to transmit an indication of a capability of the UE to change beams within a time period, wherein the configuration is based on the capability.

Aspect 82: The non-transitory computer-readable medium of any of Aspects 73-81, wherein the configuration is applicable when the transmission has a sub-carrier spacing greater than a threshold value.

Aspect 83: The non-transitory computer-readable medium of any of Aspects 73-82, wherein the configuration is applicable to a bandwidth part for the transmission.

Aspect 84: The non-transitory computer-readable medium of any of Aspects 73-83, wherein the physical channel is one of a control channel or a data channel.

Aspect 85: A non-transitory computer-readable medium storing computer executable code, the code when executed by a processor of a base station causes the processor to: transmit a configuration indicating whether a beam switching gap is expected at a first symbol position within a subframe of a physical channel for a user equipment (UE), the first symbol position having a first cyclic prefix length that is longer than a second cyclic prefix length of a second symbol position within the subframe of the physical channel for the UE; and determine whether a transmission includes a missing symbol for the beam switching gap based on the configuration and the symbol position of a symbol where a beam switch is scheduled.

Aspect 86: The non-transitory computer-readable medium of Aspect 85, wherein the first symbol position occurs at one or more symbols after a 0.5 millisecond boundary at a start of a subframe and at a middle of the subframe.

Aspect 87: The non-transitory computer-readable medium of Aspect 85 or 86, wherein the configuration indicates whether the beam switching gap is expected at the second symbol position of the transmission.

Aspect 88: The non-transitory computer-readable medium of Aspect 85 or 86, wherein a beam switching gap is expected at the second symbol position of the transmission regardless of the configuration.

Aspect 89: The non-transitory computer-readable medium of any of Aspects 85-88, further comprising code to change beams during a cyclic prefix of the symbol where the beam switch is scheduled in response to determining that the transmission does not include the missing symbol for the beam switching gap.

Aspect 90: The non-transitory computer-readable medium of any of Aspects 85-88, further comprising code to change beams during the missing symbol in response to determining that the transmission includes the missing symbol for the beam switching gap.

Aspect 91: The non-transitory computer-readable medium of any of Aspects 85-90, wherein the beam switching gap for the first symbol position is the same as the beam switching gap for the second symbol position.

Aspect 92: The non-transitory computer-readable medium of any of Aspects 85-90, wherein the beam switching gap for the first symbol position is different than the beam switching gap for the second symbol position.

Aspect 93: The non-transitory computer-readable medium of any of Aspects 85-92, further comprising code to receive an indication of a capability of the UE to change beams within a time period, wherein the configuration is based on the capability.

Aspect 94: The non-transitory computer-readable medium of any of Aspects 85-93, wherein the configuration is applicable when the transmission has a subcarrier spacing greater than a threshold value.

Aspect 95: The non-transitory computer-readable medium of any of Aspects 85-94, wherein the configuration is applicable to a bandwidth part for the transmission.

Aspect 96: The non-transitory computer-readable medium of any of Aspects 85-95, wherein the physical channel is one of a control channel or a data channel.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. An apparatus for wireless communication for a user equipment (UE), comprising:
   a memory storing computer-executable instructions; and
   at least one processor coupled to the memory and configured to execute the computer-executable instructions to:
   receive a configuration indicating whether a beam switching gap is expected at a first symbol position within a subframe of a physical channel for the UE, the first symbol position having a first cyclic prefix length that is longer than a second cyclic prefix length of a second symbol position within the subframe of the physical channel for the UE; and
   determine whether a transmission includes a missing symbol for the beam switching gap based on the configuration and the symbol position of a symbol where a beam switch is scheduled.

2. The apparatus of claim 1, wherein the first symbol position occurs at one or more symbols after a 0.5 millisecond boundary at a start of the subframe and at a middle of the subframe.

3. The apparatus of claim 1, wherein the configuration indicates whether the beam switching gap is expected at the second symbol position of the transmission.

4. The apparatus of claim 1, wherein a beam switching gap is expected at the second symbol position of the transmission regardless of the configuration.

5. The apparatus of claim 1, wherein the at least one processor is configured to change beams during a cyclic prefix of the symbol where the beam switch is scheduled in response to determining that the transmission does not include the missing symbol for the beam switching gap.

6. The apparatus of claim 1, wherein the at least one processor is configured to change beams during the missing symbol in response to determining that the transmission includes the missing symbol for the beam switching gap.

7. The apparatus of claim 1, wherein the beam switching gap for the first symbol position is the same as the beam switching gap for the second symbol position.

8. The apparatus of claim 1, wherein the beam switching gap for the first symbol position is different than the beam switching gap for the second symbol position.

9. The apparatus of claim 1, wherein the at least one processor is configured to transmit an indication of a capability of the UE to change beams within a time period, wherein the configuration is based on the capability.

10. The apparatus of claim 1, wherein the configuration is applicable when the transmission has a sub-carrier spacing greater than a threshold value.

11. The apparatus of claim 1, wherein the configuration is applicable to a bandwidth part for the transmission.

12. The apparatus of claim 1, wherein the physical channel is one of a control channel or a data channel.

13. An apparatus for wireless communication for a base station, comprising:
a memory storing computer-executable instructions; and
at least one processor coupled to the memory and configured to execute the computer-executable instructions to:
transmit a configuration indicating whether a beam switching gap is expected at a first symbol position within a subframe of a physical channel for a user equipment (UE), the first symbol position having a first cyclic prefix length that is longer than a second cyclic prefix length of a second symbol position within the subframe of the physical channel for the UE; and
determine whether a transmission includes a missing symbol for the beam switching gap based on the configuration and the symbol position of a symbol where a beam switch is scheduled.

14. The apparatus of claim 13, wherein the first symbol position occurs at one or more symbols after a 0.5 millisecond boundary at a start of a subframe and at a middle of the subframe.

15. The apparatus of claim 13, wherein the configuration indicates whether the beam switching gap is expected at the second symbol position of the transmission.

16. The apparatus of claim 13, wherein a beam switching gap is expected at the second symbol position of the transmission regardless of the configuration.

17. The apparatus of claim 13, wherein the at least one processor is configured to change beams during a cyclic prefix of the symbol where the beam switch is scheduled in response to determining that the transmission does not include the missing symbol for the beam switching gap.

18. The apparatus of claim 13, wherein the at least one processor is configured to change beams during the missing symbol in response to determining that the transmission includes the missing symbol for the beam switching gap.

19. The apparatus of claim 13, wherein the beam switching gap for the first symbol position is the same as the beam switching gap for the second symbol position.

20. The apparatus of claim 13, wherein the beam switching gap for the first symbol position is different than the beam switching gap for the second symbol position.

21. The apparatus of claim 13, wherein the at least one processor is configured to receive an indication of a capability of the UE to change beams within a time period, wherein the configuration is based on the capability.

22. The apparatus of claim 13, wherein the configuration is applicable when the transmission has a sub-carrier spacing greater than a threshold value.

23. The apparatus of claim 13, wherein the configuration is applicable to a bandwidth part for the transmission.

24. The apparatus of claim 13, wherein the physical channel is one of a control channel or a data channel.

25. A method of wireless communication, comprising, at a user equipment (UE):
receiving a configuration indicating whether a beam switching gap is expected at a first symbol position within a subframe of a physical channel for the UE, the first symbol position having a first cyclic prefix length that is longer than a second cyclic prefix length of a second symbol position within the subframe of the physical channel for the UE; and
determining whether a transmission includes a missing symbol for the beam switching gap based on the configuration and the symbol position of a symbol where a beam switch is scheduled.

26. The method of claim 25, wherein the first symbol position occurs at one or more symbols after a 0.5 millisecond boundary at a start of the subframe and at a middle of the subframe.

27. The method of claim 25, further comprising changing beams during a cyclic prefix of the symbol where the beam switch is scheduled in response to determining that the transmission does not include the missing symbol for the beam switching gap.

28. The method of claim 25, further comprising changing beams during the missing symbol in response to determining that the transmission includes the missing symbol for the beam switching gap.

29. The method of claim 25, further comprising transmitting an indication of a capability of the UE to change beams within a time period, wherein the configuration is based on the capability.

30. A method of wireless communication, comprising, at a base station:
transmitting a configuration indicating whether a beam switching gap is expected at a first symbol position within a subframe of a physical channel for a user equipment (UE), the first symbol position having a first cyclic prefix length that is longer than a second cyclic prefix length of a second symbol position within the subframe of the physical channel for the UE; and
determining whether a transmission includes a missing symbol for the beam switching gap based on the configuration and the symbol position of a symbol where a beam switch is scheduled.

\* \* \* \* \*